(12) United States Patent
Nagaoka et al.

(10) Patent No.: US 6,363,291 B2
(45) Date of Patent: *Mar. 26, 2002

(54) PROCESS INFORMATION MANAGEMENT SYSTEM

(75) Inventors: Masao Nagaoka; Toyozou Morinaka; Isao Isomura, all of Mie (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,678

(22) Filed: May 27, 1998

(30) Foreign Application Priority Data

Jun. 4, 1997 (JP) ............................... 9-146421

(51) Int. Cl.[7] .............................. G06F 7/00; G06F 19/00
(52) U.S. Cl. ........................... 700/100; 700/95; 700/97; 707/102
(58) Field of Search ................................. 700/117, 100, 700/99, 97, 96, 95; 707/102

(56) References Cited

U.S. PATENT DOCUMENTS 4,875,162 A * 10/1989 Ferriter et al. ................ 705/29
5,089,970 A * 2/1992 Lee et al. ...................... 700/96
5,150,288 A * 9/1992 Imai et al. ...................... 700/3
5,255,197 A * 10/1993 Iida ............................. 700/108
5,303,144 A * 4/1994 Kawashima et al. ........... 705/8
5,579,231 A * 11/1996 Sudou et al. .................. 700/95
5,630,125 A * 5/1997 Zellweger ................... 707/103
5,806,069 A * 9/1998 Wakiyama et al. ......... 707/102
5,883,805 A * 3/1999 Sada .......................... 700/100
5,924,103 A * 7/1999 Ahmed et al. .............. 707/201
5,983,195 A * 11/1999 Fierro ......................... 705/10

FOREIGN PATENT DOCUMENTS

JP 7-168886 7/1995

* cited by examiner

Primary Examiner—William Grant
Assistant Examiner—Paul Rodriguez
(74) Attorney, Agent, or Firm—Merchant & Gould P.C.

(57) ABSTRACT

In a process information management system for efficiently managing process information, the system comprises an application information file 26 for storing application information relating at least each main part for each kind of product, wherein, by selecting the application information which is stored in the application information file 26, the application information is added as information for designating the selected application information.

3 Claims, 14 Drawing Sheets

FIG. 4

| PART NUMBER | MAIN PART NAME | PART OPERATION NAME | DESTINATION OF INSTALL | NUMBER OF ARTICLES | NUMBER OF TIME | ELEMENT | NUMBER OF PROCESS | INFORMATION |
|---|---|---|---|---|---|---|---|---|
| 32100-SR3-1000 | CABIN W/H INSTALL | CABIN W/H | DA/BO UP | 1 | 0 | FITTING | 3.6 | |
| 32100-SR3-1000 | CABIN W/H INSTALL | CABIN W/H | DA/BO L PANEL | 0 | 1 | WIRING | 6.6 | + |
| 32100-SR3-1000 | CABIN W/H INSTALL | ASSY GRO | DA/BO UP | 1 | 1 | FIXING | 4.0 | |
| 32100-SR3-1000 | CABIN W/H INSTALL | ASSY CLIP | L FR WHEEL HOUSE | 0 | 2 | INSERTION | 3.0 | |
| 32100-SR3-1000 | CABIN W/H INSTALL | ASSY CLIP | L SID SEAL | 0 | 3 | INSERTION | 4.5 | |
| 32100-SR3-1000 | CABIN W/H INSTALL | ASSY CLIP | L ENG ROOM | 0 | 7 | INSERTION | 10.5 | |

FIG. 11

| APPLICATION CODE MANAGEMENT NO. | 1 | KIND OF PRODUCTS | 2 | APPLICATION REFERENCE PART NO. | 4 | – | – |
|---|---|---|---|---|---|---|---|
| APPLICATION CODE SUMMARY | 3 | | | | | | |

| DERIVATION | 0 | 1 | 2 | 3 | 4 | 5 | 6 | 7 | 8 | 9 |
|---|---|---|---|---|---|---|---|---|---|---|
| 0 | | | ■ | ■ | | | | | | |
| 1 | | | ■ | ■ | | | | | | |
| 2 | ■ | ■ | ■ | ■ | ■ | | ■ | | | |
| 3 | ■ | ■ | ■ | ■ | ■ | | ■ | | | |
| 4 | ■ | ■ | | | | ■ | | | | ■ |
| 5 | ■ | ■ | | | ■ | ■ | | | | ■ |
| 6 | ■ | ■ | | | ■ | ■ | | | ■ | |
| 7 | ■ | ■ | | | ■ | ■ | | | ■ | |
| 8 | | | | | | | | | | |
| 9 | | | | | | | | | | |
| | | | | | | | | | | |
| F | | | ■ | ■ | | | | | | ■ |
| G | | | ■ | | | | | | | ■ |
| S | | | ■ | | | | | ■ | ■ | ■ |
| W | | ■ | ■ | ■ | | | | | | ■ |
| Z | | ■ | ■ | | | | ■ | ■ | ■ | ■ |
| | | | | | | | | | | |
| E | | | ■ | ■ | | | | | | ■ |
| Q | | | ■ | | ■ | ■ | | | ■ | ■ |
| | | | | | | | | | | |
| P | | ■ | ■ | | | | | | ■ | ■ |
| T | | ■ | ■ | | | | | | ■ | ■ |
| Y | | ■ | ■ | | | | ■ | ■ | ■ | ■ |

FIG. 13A

APPLICATION TABLE FOR
EACH PART DERIVATION
PART A
32100-SR3-0000

|   | 0 | 1 | 2 | 3 | 4 | · | · | · |
|---|---|---|---|---|---|---|---|---|
| 1 |   | * |   | * |   | * |   |   |
| 2 |   | * |   |   |   | * |   |   |
| 3 |   |   |   | * |   |   |   |   |
| 4 |   |   |   |   |   |   |   |   |
| · |   |   |   |   |   |   |   |   |
| · |   |   |   |   |   |   |   |   |

FIG. 13B

PART A
32100-SR3-9000

|   | 0 | 1 | 2 | 3 | 4 | · | · | · |
|---|---|---|---|---|---|---|---|---|
| 1 |   |   | * |   | * |   |   |   |
| 2 |   |   | * | * | * |   |   |   |
| 3 |   |   |   |   |   |   |   |   |
| 4 |   |   |   |   |   |   |   |   |
| · |   |   |   |   |   |   |   |   |
| · |   |   |   |   |   |   |   |   |

FIG. 13C

APPLICATION CODE
ONLY MAIN NO.
32100

|   | 0 | 1 | 2 | 3 | 4 | · | · | · |
|---|---|---|---|---|---|---|---|---|
| 1 |   | * | * | * | * | * |   |   |
| 2 |   | * | * | * | * | * |   |   |
| 3 |   |   |   | * |   |   |   |   |
| 4 |   |   |   |   |   |   |   |   |
| · |   |   |   |   |   |   |   |   |
| · |   |   |   |   |   |   |   |   |

FIG. 13D

ALL PARTS NO.
32100-SR3-900

|   | 0 | 1 | 2 | 3 | 4 | · | · | · |
|---|---|---|---|---|---|---|---|---|
| 1 |   | * |   | * |   | * |   |   |
| 2 |   | * |   | * |   | * |   |   |
| 3 |   |   |   |   |   |   |   |   |
| 4 |   |   |   |   |   |   |   |   |
| · |   |   |   |   |   |   |   |   |
| · |   |   |   |   |   |   |   |   |

FIG. 16

```
┌─ DISPLAY OF APPLICATION CONTENTS
│ ┌─┬─┬─┬─┬─┬─┬─┬─┐
│ │0│1│2│3│4│·│·│·│
│ ├─┼─┼─┼─┼─┼─┼─┴─┤
│ │1│*│*│*│*│*│   │
│ ├─┼─┼─┼─┼─┼─┤   │
│ │2│*│*│*│*│*│   │
│ ├─┼─┼─┼─┼─┼─┤   │
│ │3│*│*│*│*│*│   │
│ ├─┼─┼─┼─┼─┼─┤   │
│ │4│*│*│*│*│*│   │
│ ├─┼─┴─┴─┴─┴─┤   │
│ │·│         │   │
│ │·│         │   │
│ └─┴─────────┴───┘
└──────────────────
```

PROCESS INFORMATION MANAGEMENT SYSTEM

BACKGROUND OF THE INVENTION

1. Field of the Invention

The present invention relates to a process information management system, and in particular relates to a process information management system for managing process information relating to production processes for producing plural kinds of products on a production line.

2. Description of Related Art

For example, in a factory where cars are assembled and tested, when building or introducing a new production line for a new model car, or changing the existing production line for improving the efficiency thereof, there is a necessity to assess the parts which are necessary for assembling the cars, and the work amount for calculating the cost of assembling those parts, with accuracy, so as to effectively organize efficient work processes. Therefore, a management system is used for managing information related to the work amount and the process information.

In this case, for such a management system, the following considerations are required: i.e., to compose or organize the most suitable production line by grasping or understanding drawbacks in configuration of the production line due to any imbalance in the work amount necessary for production, such drawbacks to be examined by evaluating the distribution in the work amount with respect to each model to be manufactured in the production line therefor; to evaluate the distribution of the respective work processes and examine the imbalance therein, so as to grasp any drawbacks in the configuration of the production line due to the imbalance and change the composition of the production line; and to compose the most suitable complex production line, by comparing and evaluating the distribution of the work amount in the complex production line with respect to the respective models and the respective work processes, and further by evaluating any imbalance in the work amount accompanying the differences in the constructions of the respective models.

A process information management system, with which process information can be processed immediately and effectively, is already known, for example, in Japanese Laid-open Patent Hei 7-168886 (1995).

In this process information management system, the process information is provided by combining work amount information for calculating the production cost on the basis of work procedures for assembling and testing plural kinds of products in a production line of a factory together with work information indicating the work procedures, and an element work record is formed by adding analysis information (i.e., classification information and search information) of the process information. This system is constructed by including a process organizing stage for organizing the work process by arranging each of the element work records in a time sequence, and a process evaluating stage for optionally analyzing the work process and for summing and evaluating the work amount which means the time being consumed on the work procedures, and therefore, the work processes can be recomposed in accordance with the result obtained from the evaluation, if necessary.

However, in the conventional process information management system mentioned above, when being compiled or compared on a basis of at least one of a plurality of items which can be set as classification information which is a kind of analysis information, only data which is inputted as numerical values can be used therein. Therefore, the kind of item (data) which can be inputted is limited or restricted when compiling or comparing it on the basis of the required set of items, and it is difficult to apply data which is complied or compared to the processing in other steps, thereby making effective use of the management system difficult if not impossible.

Further, with main or principal parts of the products, when adding application information for indicating whether the parts are to be applied to the product (the model) or not, or when adding information for designating (or specifying), i.e., an application code number, as classification information, a worker or operator who conducts the inputting operation must input the application information for the respective element work records on the basis of the application information for respective specifications of the main parts (a destination country for shipping, a grade, etc.) which are described on a parts-list in the form of a booklet. Therefore, the number of steps in the input operation is increased, thereby decreasing the efficiency in the input operation and prohibiting effective use of the system.

SUMMARY OF THE INVENTION

An object, therefore, in accordance with the present invention, for resolving the drawbacks in the conventional art mentioned in the above, is to provide a process information management system enabling effective use thereof.

For attaining the above object, in accordance with the present invention, there is proposed a process information management system for managing process information on the basis of work procedures, said process information relating to processes for producing plural kinds of products on a production line and including work information for indicating each of the work procedures and work amount information for indicating the work amount of said work, comprising:

process compiling means for producing element work information by adding classification information to said process information, for composing work processes by arranging said element work information, and for memorizing said element work information as a sequence of files when said element work information is produced;

process evaluation means for compiling partial work processes by classifying total work processes on the basis of said classification information, for summing said work amount information in each of the partial work processes according to the kinds of said products, and for evaluating said total work processes on the basis of a result of the summation of the work amount information according to the plural kind of said products;

classification information selecting means for selecting information to be set as said classification information; and classification information addition means for adding the information selected by said classification information selecting means as said classification information.

In accordance with the present invention described above, there is also proposed a process information management system for managing process information on the basis of work procedures, said process information relating to processes for producing plural kinds of products on a production line and including work information for indicating each of the work procedures and work amount information for indicating the work amount of said work, comprising:

process compiling means for producing element work information by adding classification information to said process information, for composing work processes by arranging said element work information, and for memorizing said element work information as a sequence of files when said element work information is produced;

process evaluation means for compiling partial work processes by classifying total work processes on the basis of said classification information, for summing said work amount information in each of the partial work processes according to the kinds of said products, and for evaluating said total work processes on the basis of a result of the summation of the work amount information according to the kind of said products;

application information storing means for storing at least application information of each of main parts for each kind of said products;

application information selection means for selecting said application information stored in said application information storing means; and application information addition means for adding information designating the application information which is selected by said application information selection means as said classification information.

In accordance with the present invention, there is further proposed a process information management system as described above, wherein said application information selection means includes means for processing a plurality of the selected application information into a single unit of application information, and said application information addition means includes means for adding information designating the application information after being processed by said application information selection means to said classification information.

BRIEF DESCRIPTION OF DRAWINGS

FIG. 2 is a block diagram for showing the same process information management system;

FIG. 11 is a view showing an example of an application code table;

FIGS. 13(a) to (d) are explanatory views for explaining the production of the application code table;

FIG. 16 is an explanatory view of an example of display of application contents for explaining the setting of the application code.

DESCRIPTION OF THE PREFERRED EMBODIMENTS

Figure 1:
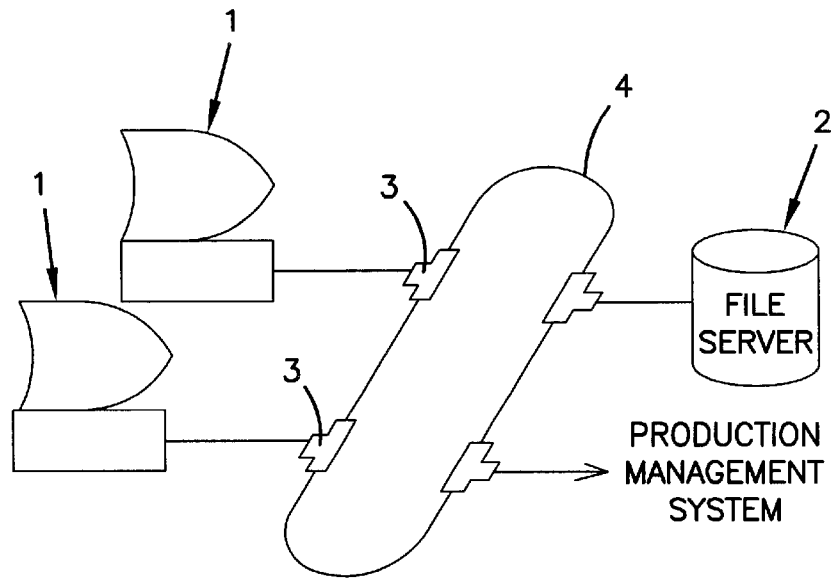
FIG. 1 is a schematic diagram for showing a process information management system as a whole, in accordance with the present invention.

Hereinafter, detailed explanation of the embodiments according to the present invention will be given by referring to the attached drawings. FIG. 1 is a schematic diagram for showing a process information management system as a whole, according to the present invention, and FIG. 2 is a block diagram for showing the same process information management system.

The process information management system is constructed with a plurality of terminal devices 1 and a file server 2, which are connected as a local area network (LAN) 4 to one another through connecting devices 3. The process information management system as a whole is connected to a central processing device of a production management system for the overall management of the production functions in a factory as a whole through the LAN 4.

Each terminal device 1, comprising a personal computer and peripheral devices thereof which are well-known, includes: a main body portion 14 including a central processing unit (CPU) 11 for processing various kinds of data, a program memory 12, comprising for example a ROM and/or other recording means, for storing control programs and other fixed data which are necessary to process the various kinds of data, and a working memory 13, comprising for example a RAM and/or other memory means, for storing data for work; a keyboard 15 for inputting various information; a display device 16 (i.e., a CRT display device) for displaying various information thereon; and a printer device 17 for outputting various kinds of information as print copy, etc.

Figure 3:
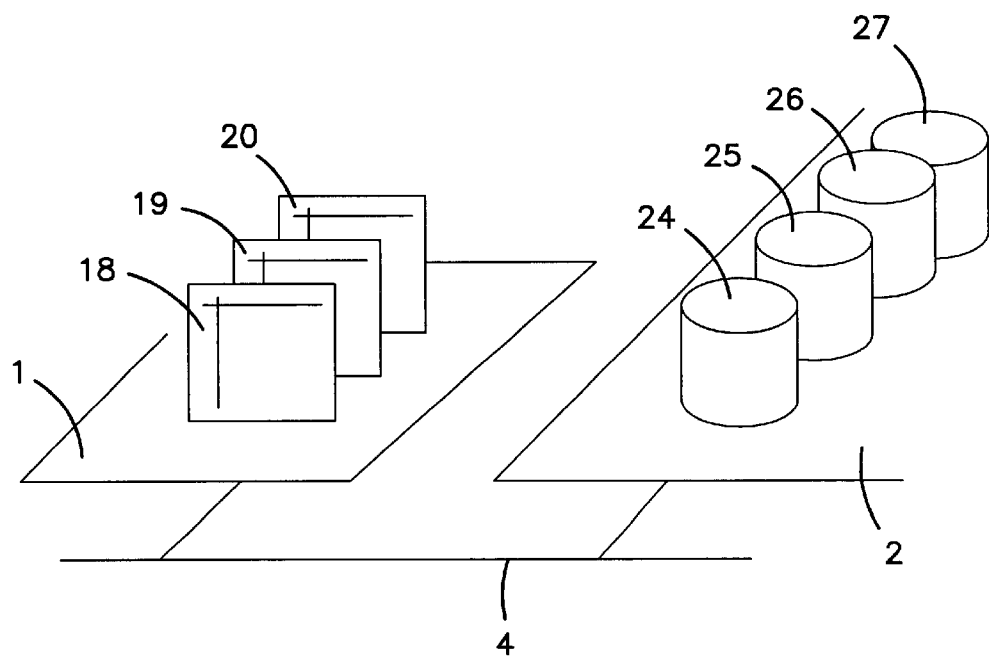
FIG. 3 is an explanatory view for explaining the file construction of a terminal device and a file server of the same system.

Here, in the program memories 12 of the plural terminal devices 1, as shown in FIG. 3, there are memorized or stored: a process table 18 for arranging all element work information or a part thereof which composes or comprises the element work information on the basis of classification information or search information contained therein (both are analysis information for analyzing the process information); a search table 19 for arranging the search information on the basis of a predetermined logical relationship; and a work amount table 20 for arranging the summed work amount, which is totaled after being partially summed, according to each model and each kind of derivation thereof.

Now, turning to FIG. 2, the file server 2 comprises a central processing unit (CPU) 21 for processing various data; a program memory 22 for storing fixed data, such as control programs or the like which are necessary for processing the various kinds of data; a working memory 23 comprising RAM and so on for storing data for work, and other memory means; and, a file memory for storing various kinds of files.

In the file memory, there are stored various kinds of files, including: an element work file 24 for filing element work information (i.e., element work data); a part data file 25 for filing data related to parts; an application information file 26 for storing application information (i.e., an application code table) for each kind of product (or each model of product to be produced) and an application code number for designating the application code table, at least for the main parts thereof; a parameter file 27 for storing parameters which are set in advance, such as details of each work process, for the purpose of summing up the total work amount of the model, the derivation or the production line, to which each of the element work information is applied; an assembly drawing name file 28 for storing names of assembly drawings; and a part name file 29 for storing names of parts, etc. These files 23–29 are files which are stored in the memory. However, they are illustrated as blocks for clarification of explanation thereof.

Here, regarding the element work information (hereinafter also referred to as the element work record) stored in the element work file 24, explanation will be given by referring to FIGS. 4 and 5.

Figure 4:
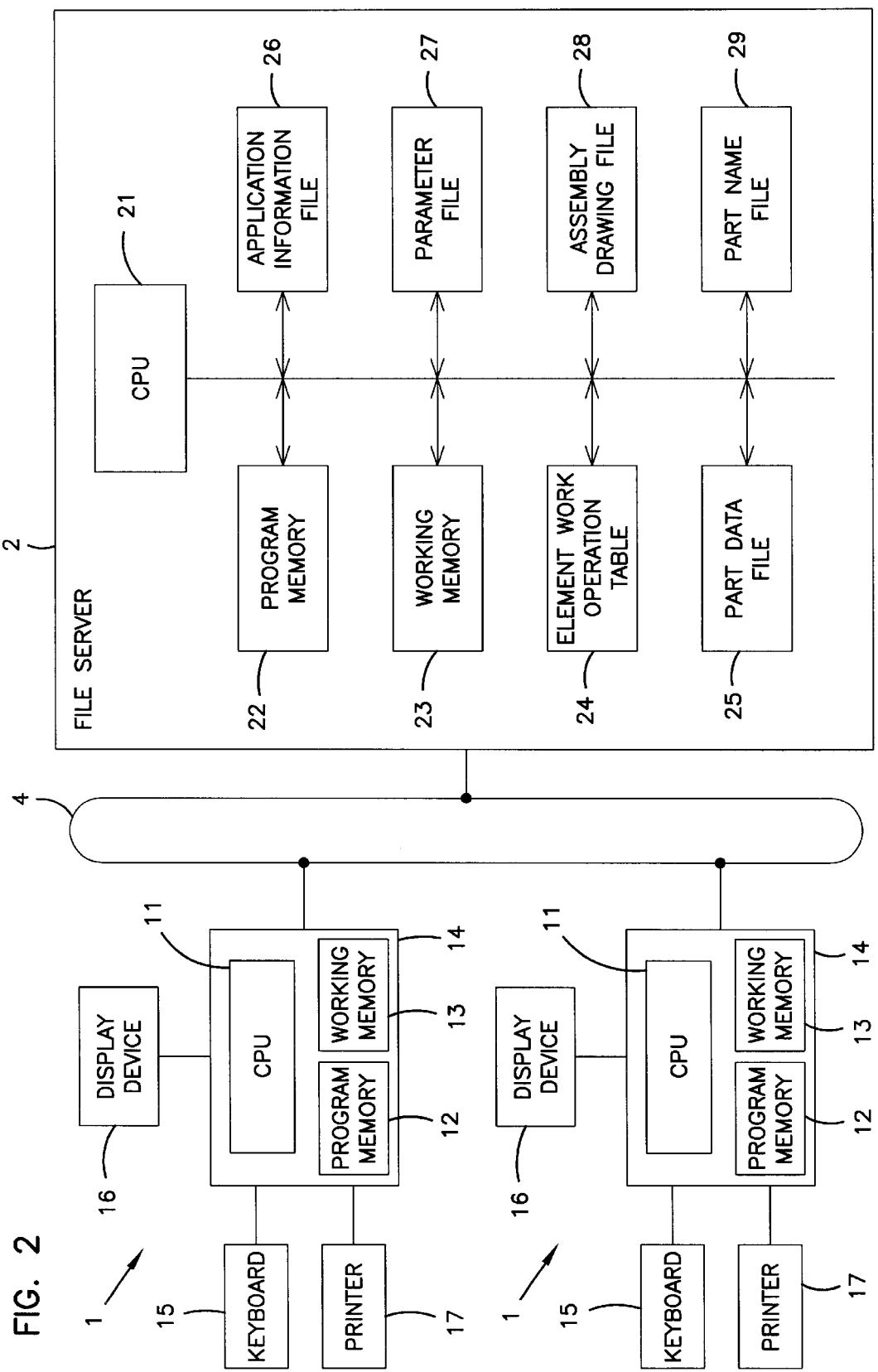
FIG. 4 is an explanatory view for explaining basic management items of element work.

Management of the work amount on the basis of the element work is done by use of a file which is made by adding various information including function applicability, equipment applicability, function, work position, work classification, body number, zone, group in charge, subgroup, process number, category, module, assembly drawing number, difficulty of work, tools, attachment, supplemental material, etc., to the basic items of management, as shown in FIG. 4, including part number, work name of part, destination of installation, number of articles, element, and work amount.

In this case, the work amount is analyzed and standardized with a unified method such as the so-called MOST method, by classifying or dividing works as elements into main works and supplemental works, and by subdividing these main works and supplemental works into basic main actions, supplemental actions for establishing the main works or the supplemental works, and quasi-actions preparing or post-handling for the main actions.

Figure 5:
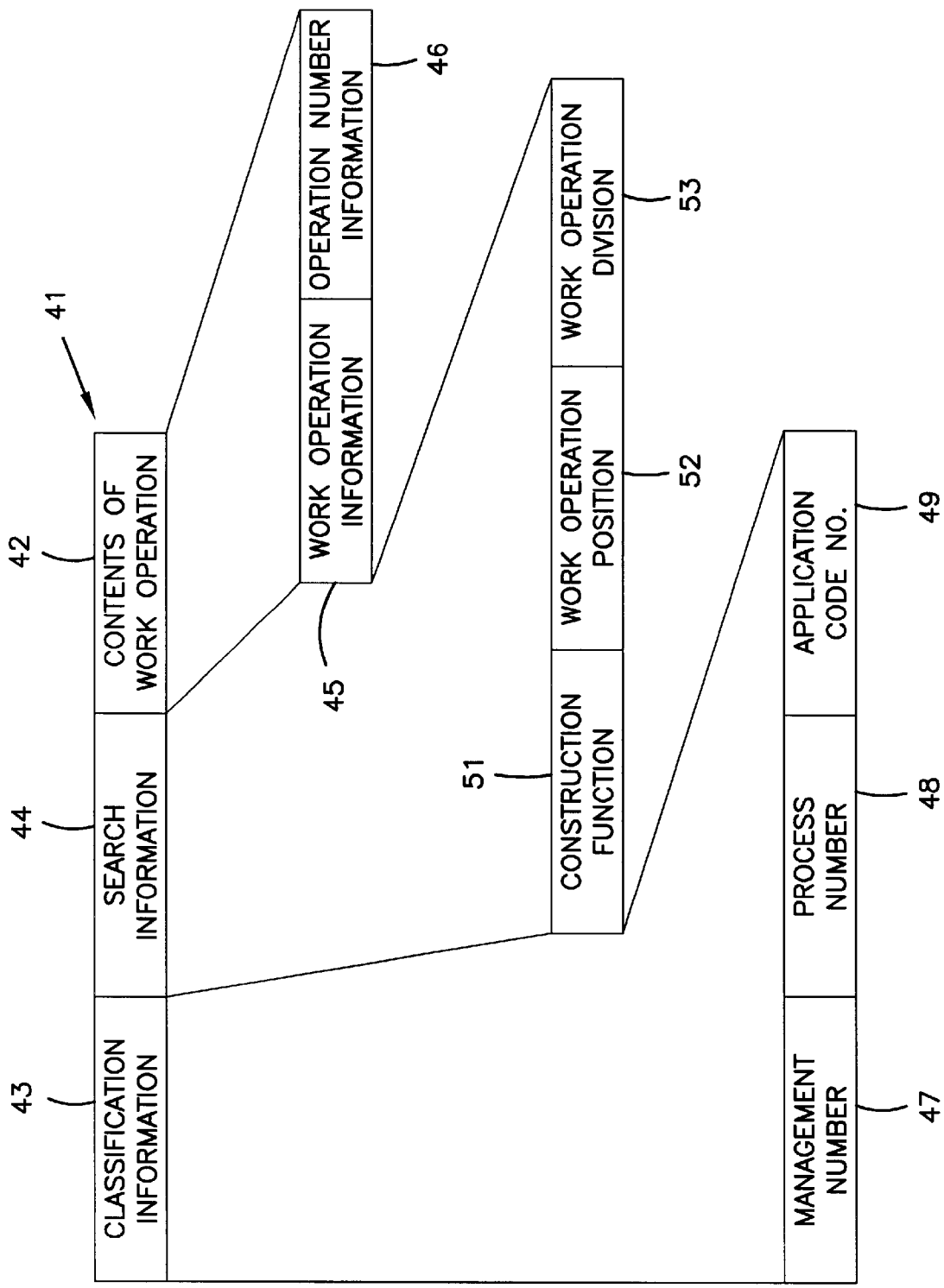
FIG. 5 is an explanatory view for explaining the data construction of an element work record.

Next, the element work information 41, as shown in FIG. 5, is constructed by adding the classification information 43 and the search information 44 to the work content information 42. The work content information 42 is constructed with the work information 45 for indicating work procedure which is constructed by dividing the works required for the production (assembling and testing) on a production line in a factory into the element works and combining the element works with the part number, the work amount information 46 which is set for each element work in the manner as mentioned above, and so on.

Further, the classification information 43 functions as a key for classification in order to classify the work content information 42 in accordance with the respective uses on the work process tables and to store it into the element work file 24. In this classification information 43, there can be set a management number 47 for managing each assembly drawing by means of the assembly drawing number, a process number 48 for indicating each work process by the process number, an application code number 49 for identifying (designating) application information of the main parts for each kind of product, and various kinds of information which are added to the basic items for management for use in the work amount management by the element work mentioned above.

Further, the search information 44 functions as a search key for searching the work content information 42 among the element work files 24 for respective uses in evaluation of the work processes. In the information, there can be set various data which are added to the basic management items for use in the work amount management by the element work mentioned above, including: construction function information 51 for selecting the functional element which constructs, for example, the basic or optional functions of cars; work position information 52 for indicating the position of the work; and work division information 53 for dividing or grouping the work contents based on the properties thereof.

Next, the function of the process information management system which is constructed as described above will be explained by referring to FIG. 6 and those following drawings.

Figure 6:
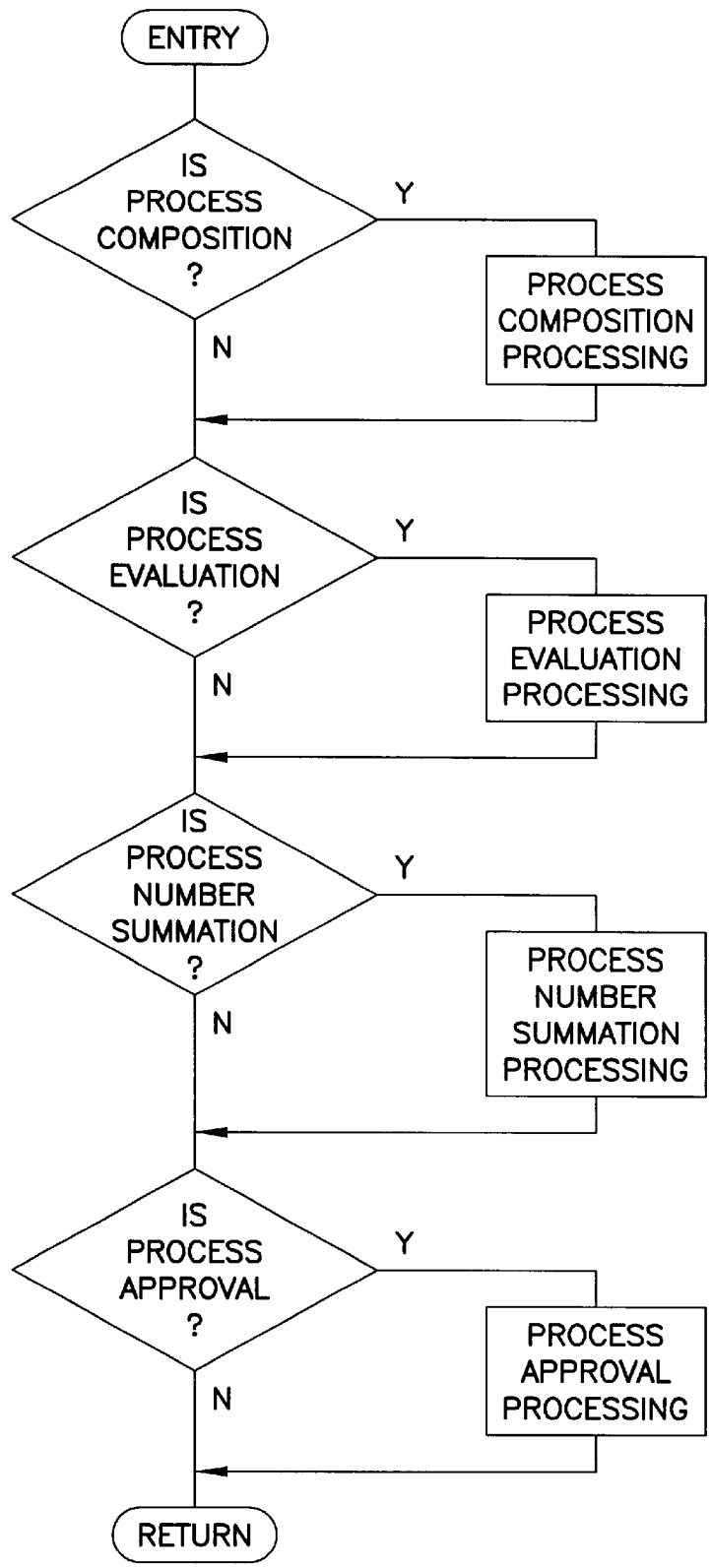
FIG. 6 is a flow chart for explanation of the same system as a whole.

First of all, referring to FIG. 6, in this management system, it is decided whether a process composition has been designated or not, and if a process composition has been designated, processing for the process composition is carried out. In this processing for the process composition, an operator (or a manager of the process) produces the element work information (the element work record) 41 in which the classification information 43 and the search information 44 are added to the work content information 42, by inputting the work content information 42, the classification information 43, and the search information 44, etc., through the terminal device 1, for each model to be produced with reference to an assembly drawing as a constituent unit of assembly drawings of cars. The produced element work information 41 is then arranged in time sequence, by each process number assigned to each work process as a constituent unit of the production line, so as to compose the work process (what has been composed is called a work process table). In addition, the element work information 41 is stored into the element work file 24 every time the element work information 41 is produced.

Further, if a process composition has not been designated, then it is further decided whether a process evaluation has been designated or not. When a process evaluation has been designated, processing for the process evaluation is carried out. In the processing of the process evaluation, a partial work process is compiled by classifying total work processes on the basis of the classification information 43 which is added to the element work information 41, and work amount information 46 in each of the partial work processes is summed up for each kind of product, thereby the processing of evaluating the total work process is conducted on the basis of the summed result of the work amount information 46 for each kind of product.

Further, if the process evaluation has not been designated, then it is decided whether the summation of work amount has been designated or not. When this summation of work amount has been designated, the processing of summation of work amount is carried out. In this processing of summation of work amount, the work amount is obtained by summing up the work amount information of each work process, and the work amount is summed up on all of the work process tables which are necessary for the production line, and the total work amount of the production line is obtained on the terminal device 1.

Furthermore, if the summation of work amount has not been designated, then it is decided whether a process approval has been designated or not. When the process approval has been designated, processing for the process approval is carried out. In this processing of the process approval, the process manager approves that the composed work content information and the total work amount of the production line are appropriate on the display device 16 of the terminal device 1. Upon the approval by the process manager, all of the work process tables are stored into the file server 2 together with the total work amount of the respective production lines and printed out, and predetermined information is sent to the central controller of the production managing system.

Figure 7:
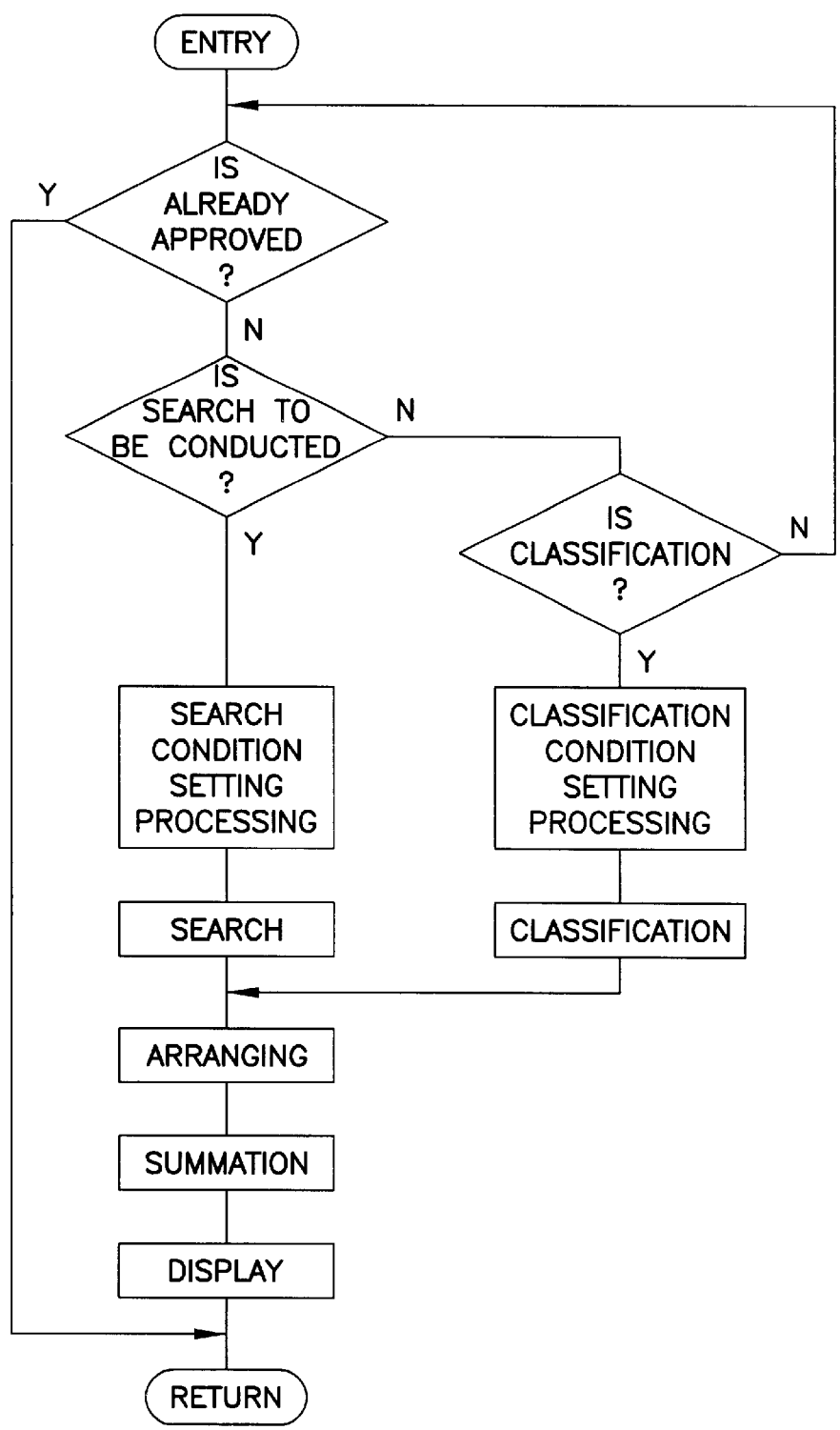
FIG. 7 is a flow chart for explaining the process evaluation processing of FIG. 6.

Here, the processing of the process evaluation will be explained by referring to FIG. 7. In this process evaluation processing, first of all, the process table 18 is checked to decide whether it has already been approved or not. If it is not yet approved, then it is decided whether a search is to be conducted or not. If a search is to be conducted, processing for setting the search condition(s) for selecting an arbitrary search condition from the search information 44 is carried out, and the search is conducted on the basis of the selected search condition. The group of element work records which are searched out is arranged on the process table 18, and the work amount in each of the groups of the element work records arranged on the process table 18 is summed up. Obtaining, the summed work amount, the summed work amount is divided and arranged into the respective kinds of derivations, thereby forming a picture of a work amount summation, so as to display the summed work amount, with each of the groups of the element work which are arranged, on the display device 16.

Further, if a search is not to be conducted, then it is decided whether a classification is to be set or not. If a classification is to be set, a classification condition setting processing for selecting an arbitrary classification condition (s) from the classification information 43 is carried out, and the classification is carried out on the basis of the selected classification information 43. The classified groups of the element works are arranged on the process table 18, and the work amount in each of the groups of the element works which is arranged on the process table 18 is summed up. Obtaining the summed work amount, the summed work amount is divided and arranged into the respective kinds of the derivations, thereby forming a picture of work amount summation, so as to display the summed work amount, with each of the groups of the element works which are arranged, on the display device 16.

Figure 8:
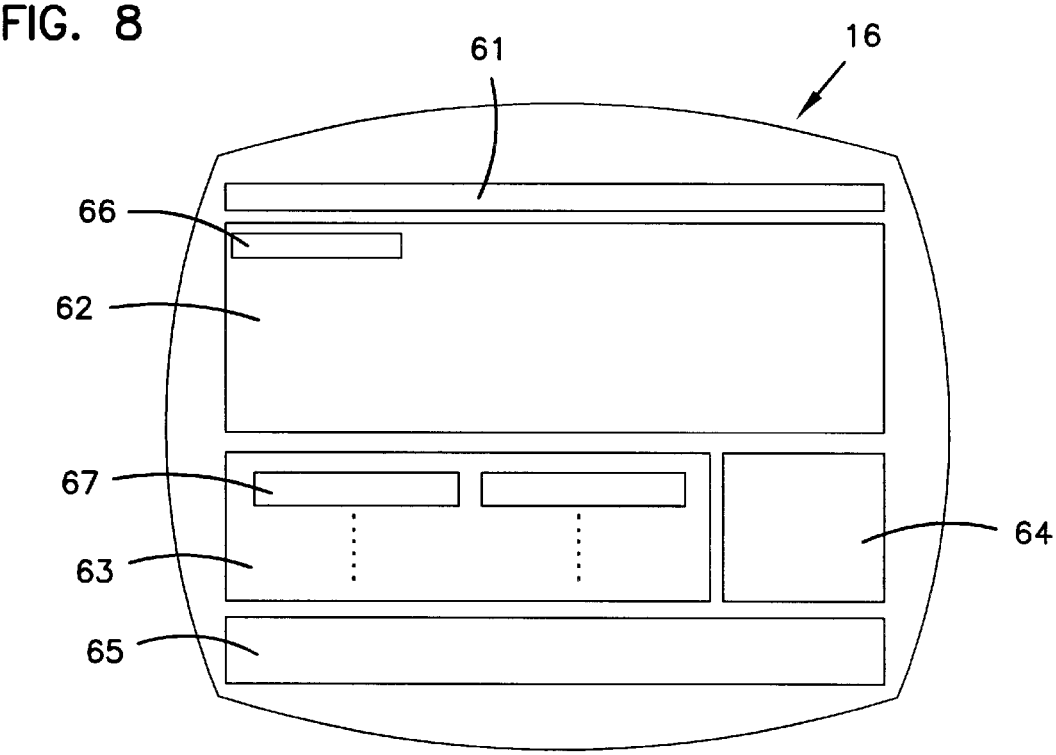
FIG. 8 is an explanatory view for explaining one example of a screen for summing work amount explained in FIG. 7.

This picture of the work amount summation is, as shown in FIG. 8, constructed with: a title region 61 where the name of the present picture in the process which is going is displayed; a work process list region 62 where concrete work processes are displayed in lines one by one along with the production lines; a summed work amount list region 63 where the work amount is summed up and displayed in each of the work process based on the derivation kind; a note region 64 where an article for a note relating to the displayed work process is displayed; and a process indication region 65 where the operator can indicate various kinds of instructions or messages for indicating concrete processes or messages.

In the title region 61, there are displayed the serial number of the corresponding production lines and the mode name of the production, etc. Further, in the work process list region 62, there is provided a name display region 66 for displaying a name on the basis of the classification information 43 and the search information 44. In the summed work amount list region 63, there are arranged and provided work amount display regions based on the derivations 67 for displaying the respective work amount and the numbers of parts based on the derivations, for each kind of the models.

Here, concrete procedures of the process evaluation will be explained by referring to FIG. 9. The procedures are started in a case where the operator composes another work process after a process composing processing has been conducted and the process table 18 has already been formed in the terminal device 1, or, in another case where the operator directly selects the execution of the process evaluation processing from a menu screen so as to evaluate the element work file 24 which is already stored (or registered) in the file server 2.

First, in the case where the process table 18 has already been produced, a message for processing approval is displayed on the screen for displaying the work amount summation, which is explained with reference to FIG. 9, and the process information management system is allowed to execute the processing or approving the process when the operator indicates the approval through the terminal device 1 responding to the message. When an indication for denying the approval is given, if the process table 18 which is already produced is not maintained in the terminal device 1, then a message for processing the search or the classification is displayed on the screen, and therefore, the processing of the search or the classification is started according to the instruction from the operator.

Figure 9:
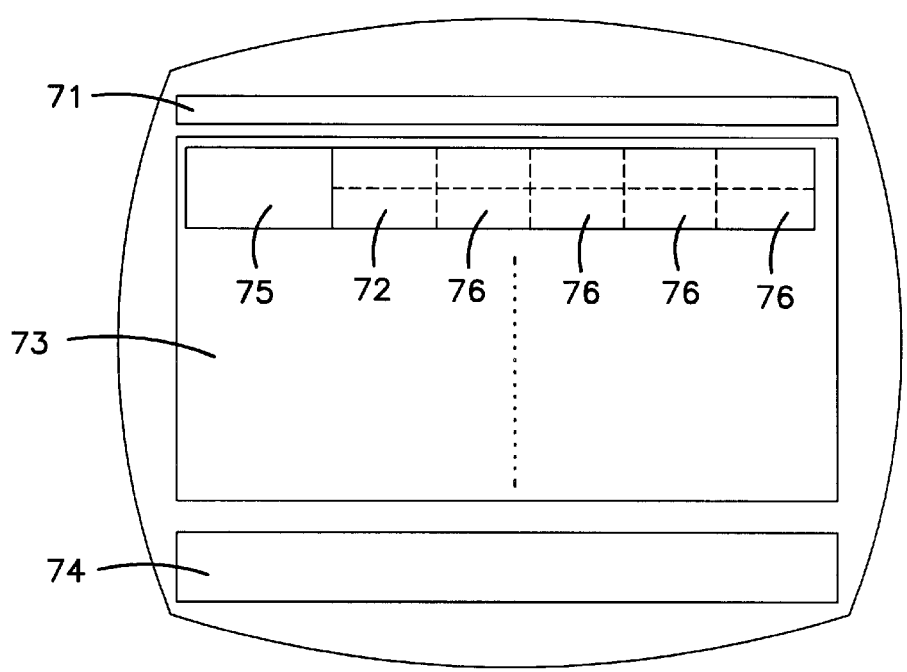
FIG. 9 is an explanatory view for explaining one example of a screen for setting classification conditions explained in FIG. 7.

For example, when the classification is instructed, the screen for setting up the condition(s) for the classification, as shown in FIG. 9, is displayed on the screen of the display device 16. This screen for setting up the condition for the classification is divided into a title region 71 for showing the title of the screen in the process which is currently in progress; a classification condition list region 73 for displaying a list of classification conditions by arranging input sections for classification input section (ie., classification keys) 72 for successively displaying each classification information, which is inputted, depending on the kind thereof; and a processing indicating region 74 for displaying guidance, various instructions and messages.

In the input sections for classification input section 72, there are provided a plurality of abbreviation portions for classification abbreviation portion 76 for displaying the abbreviations of each classification information, in which a title portion for classification title portion 75 for displaying the title of the kind of the classification information is positioned at the beginning.

While looking at the screen for setting up the condition(s) for the classification, the operator makes inputs by deciding and designating the kinds of classification information by referring the title portion for classification title portion 75, or she/he selects the abbreviation of classification information arbitrarily by using an abbreviation menu for various kinds which is displayed in the processing indicating region 74. At this time, regarding a group of abbreviations displayed in the classification abbreviation portion 76, the logic product is automatically taken for each abbreviation in all input sections for classification input section 72, and all logic products are obtained over the classification condition list region 73. The logic sum is taken, thereby the classification condition is set.

When the classification condition is set in this manner, the element work records stored in the element work file 24 are classified on the basis of the classifying logic equation, and a group of the element work records as the result of this are stored into the process table 18. The work amount is summed separately for each model and the derivation thereof, and the result thereof is stored into the work amount table 20 and also is displayed in the work process list region 62 on the display device 16.

The classification information which is added to the element work information 41 is necessary for classifying each element work record of the element work file in accordance with the contents of the work. However, if there is no restriction in the form of the classification information, only the data of the numerical input can be utilized, and as a result of this, the available classification information is undesirably restricted when compilation and/or comparison is made on the basis of the specific classification information (the set items).

Figure 10:
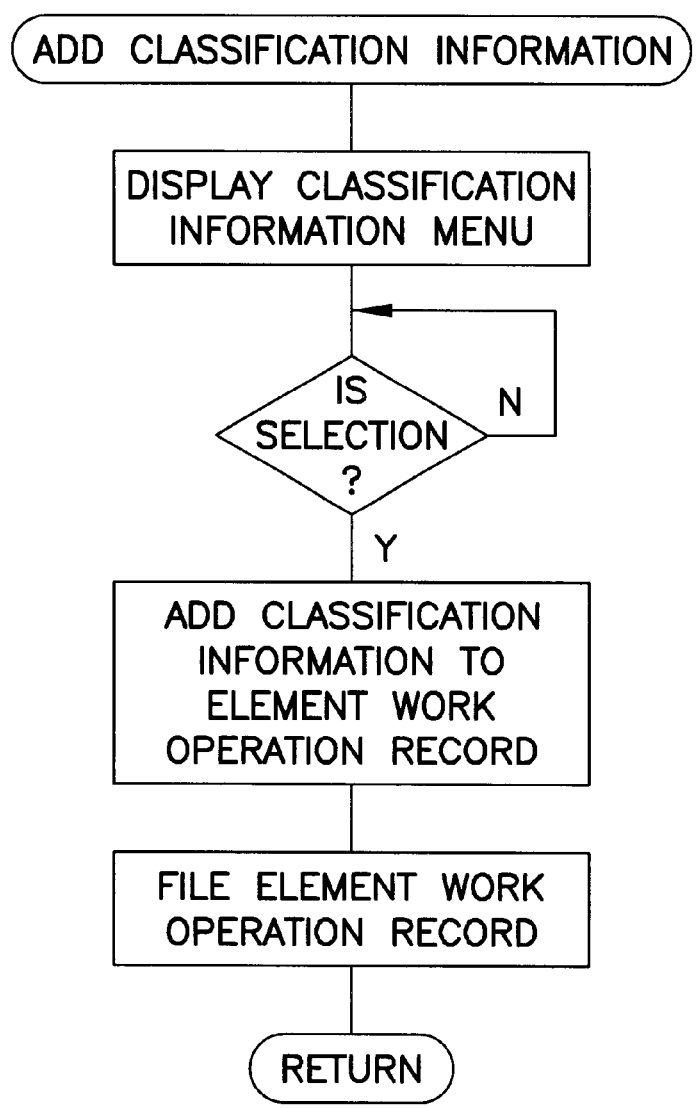
FIG. 10 is a flow chart for explanation of adding processing of the classification information to the element work information.

Then, as shown in FIG. 10, when the element work record is produced, information which can be set as classification information is displayed on the display device 16, thereby the operator selects the classification information to be set through the inputting of the search key, and the selected classification information (the set items) is added to the element work information. Therefore, the items which can be set as classification information are previously restricted in the form thereof, thereby it is possible to deal with them uniformly and it is also possible to compile and/or compare them on the basis of any classification information.

Namely, in this process information management system, at least one set of information is designated from a plurality of set items of the classification information through the terminal device by the operator, and the information is added to the element work record, so as to make it a file. Thereby, the classification information can be selected freely among a certain number/amount of information, and it can be used in the subsequent processes.

Next, an explanation will be given on the application information which is added as classification information.

First of all, in this management system, the application information of each main part for each kind of product(s) (i.e., an application code data table for each model) is previously stored in the application information file 26, and the application data is automatically set with respect to each work item by using the application code data table and the part data.

Then, an explanation will be given on the production of the application code table. As shown for example in FIG. 11, the application code table is a code table which includes an application code management No., the model to which the work is applied, an abbreviation title of the application code, a reference part number for the application, and a derivation application.

Figure 12:
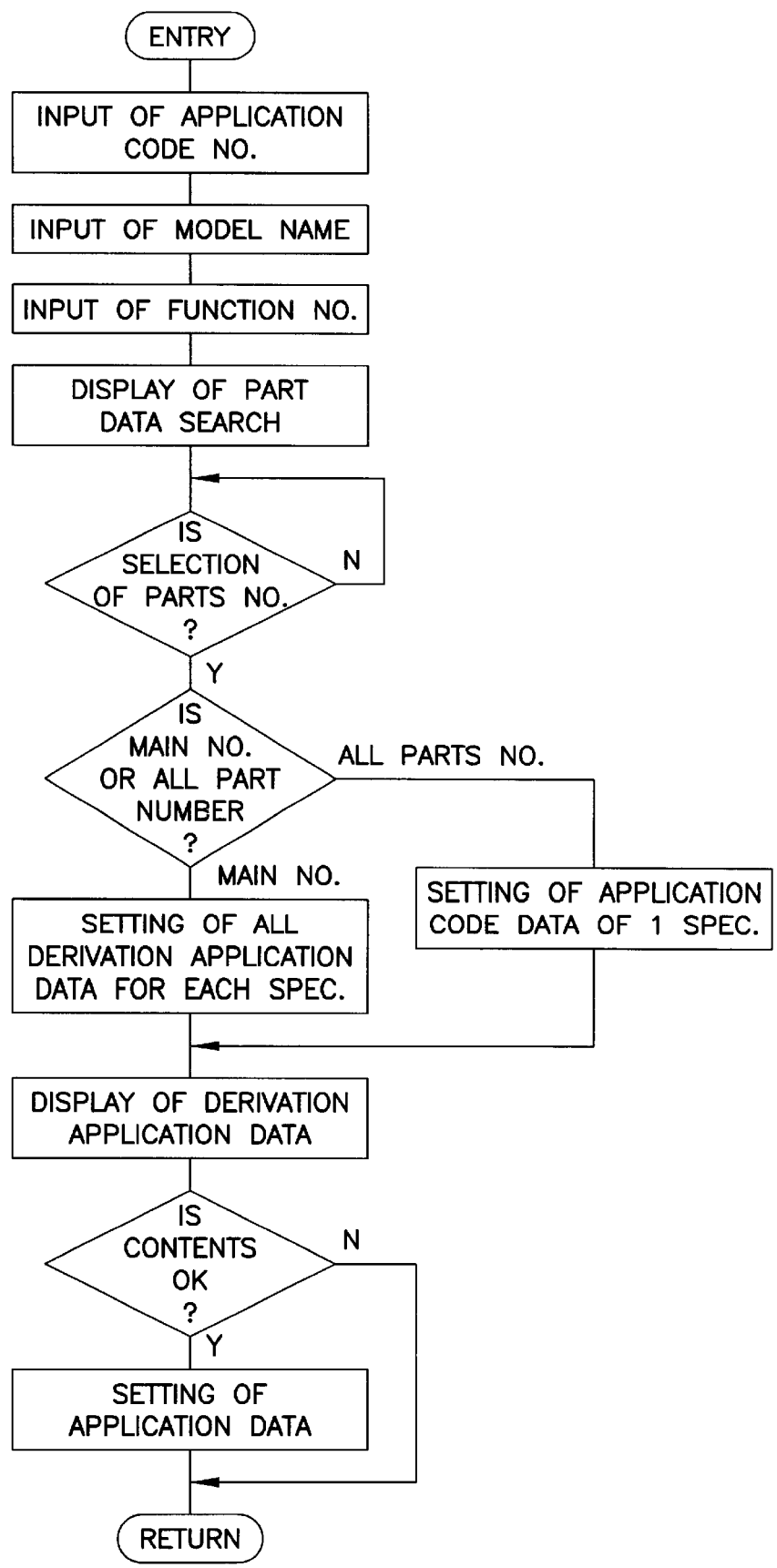
FIG. 12 is an explanatory view for explaining an input method for producing the application code table.

In the input method of the application code table, as shown in FIG. 12, part data of the part data file 25 is searched by inputting an application code No., a model name, a function No., and there are then displayed a list of a main No., a parts name, a title of applied location(s), a section/item No., a derivation application, and so on. When a corresponding item (i.e., a number of a part) is selected from the list, it is decided whether it is the setting of the main No. or of all numbers. If it is the setting of the main No., all derivation application data for each specification are set as application data. On the other hand, if it is the setting of all numbers, after setting the application data of one specification, the derivation application data is displayed, and when the contents thereof are checked, it is set as application data.

For example, referring to FIG. 13, when there is an application table for each part derivation of a part A (a part number 32100-SR3-0000 and a part number 32100-SR3-9000) which are shown in FIGS. 13 (a) and (b), in a case of only the main No. (such as 32100), the application code table draws all derivation specifications of the part as shown in FIG. 13 (c), and in a case of all numbers (such as 32100-SR3-900), the application code table draws the part specification application as shown in FIG. 13 (d).

Figures 14, 15:
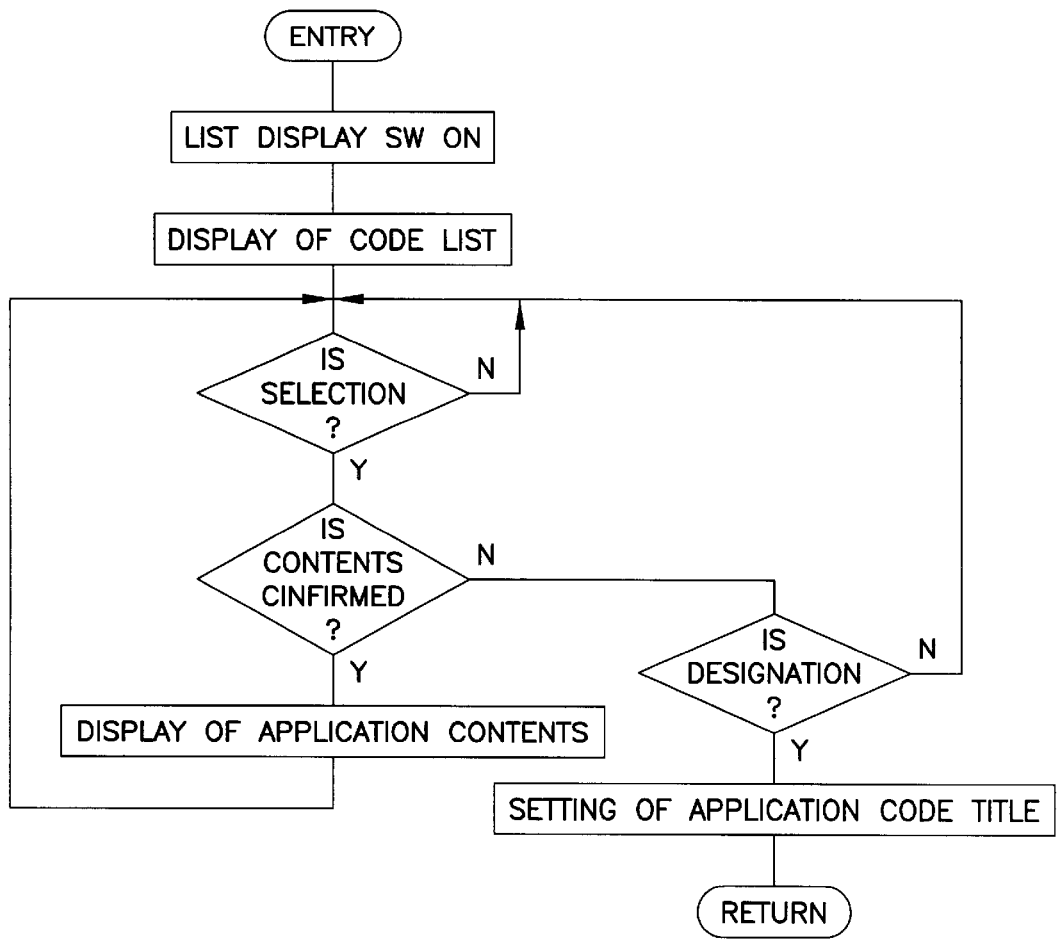
FIG. 14 is an explanatory view for explaining setting of the application code.
FIG. 15 is an explanatory view of a code list for explaining setting of the application code.

Further, the setting of the application code is as follows. When a list is designated list display SW on the screen of the display device, as shown for example in FIG. 14, a code list of the application code No. and an application summary, as shown for example in FIG. 15, are displayed by using the application code table which is stored as one of the application information files 26. When confirmation of the contents on the selected application code is instructed, such contents of the application, as shown in FIG. 16, which correspond to that application code are displayed. When selection of the application code is designated (or decided), the application code and the title thereof are set.

Figure 17:
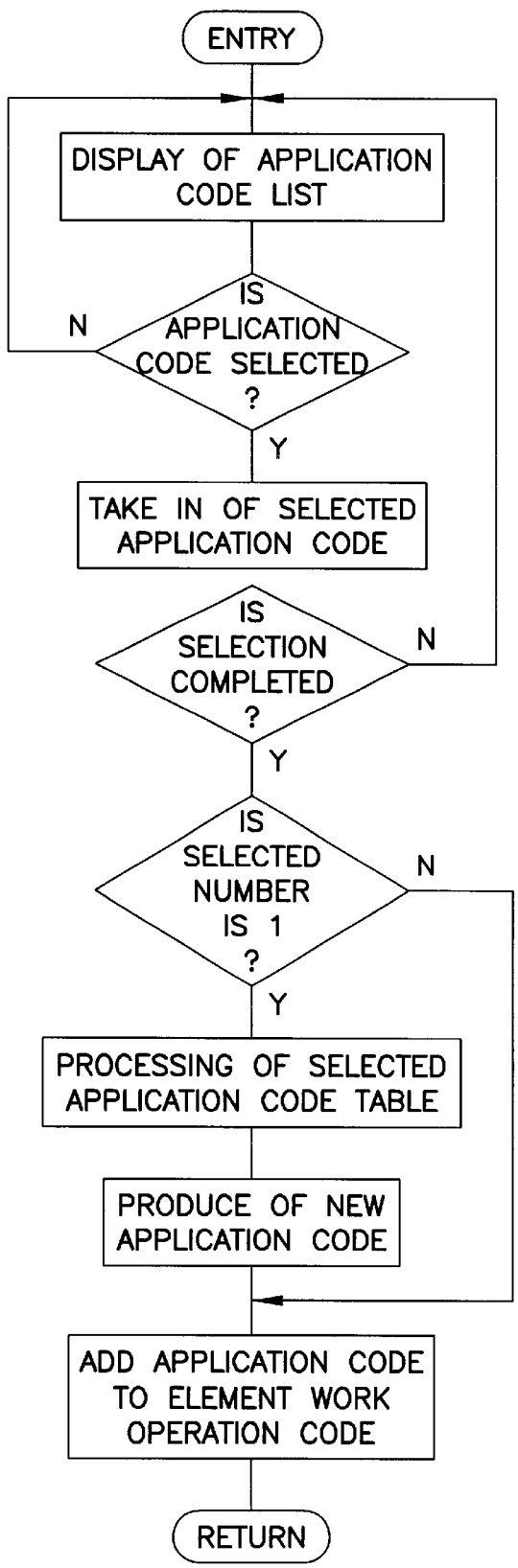
FIG. 17 is a flow chart for explaining the processing for adding the application code to the element work information.

Here, an explanation will be given by referring to FIG. 17 on a processing of adding the information for designating the application information (i.e., the application code) as the classification information for the element work record.

First, waiting for an input for selection while displaying the list of the application code, the selected application code is taken in. When the selection is completed, it is decided whether the selected application code is single or plural. In this manner, a plurality of application information can be selected as application information corresponding to the application code. In a case of a plurality of application information, either a plurality of the same application information or a plurality of different application information can be selected.

Then, when a plurality of application codes are selected, one application code table is produced by processing the plurality of application information (i.e., the application code table) corresponding to the application code, and after setting a new application code thereto, or leaving it as it is in a case where only one application code is selected, the application code No. which is newly set or selected is added as the classification information 43 of the element work record.

In this manner, by storing the application information for at least each main part for each kind of product in advance, and by selecting the stored application information and adding information for designating the selected application information as classification information, it is possible to fully utilize the application information in common. Also, the setting of the application code which is added as classification information becomes simple, thereby enabling efficient inputting operation.

In this case, by processing a plurality of application information into single unit of application information, the production of the application information and the setting of the application code can be made with ease.

The process information management system according to the present invention is only applied to a process information management system of a production line in a factory for manufacturing cars in the embodiment mentioned above. However, it may be applied to a process information management system in production lines of factories for manufacturing goods other than cars.

As is fully explained in the above, in accordance with the process information management system, there is proposed a process information management system for managing process information on the basis of work procedures, said process information relating to processes for producing plural kinds of products on a production line and including work information for indicating each of the work procedures and work amount information for indicating the work amount of said work, comprising:

process compiling means for producing element work information by adding classification information to said process information, for composing work processes by arranging said element work information, and for memorizing said element work information as a sequence of files when said element work information is produced;

process evaluation means for compiling partial work processes by classifying total work processes on the basis of said classification information, for summing said work amount information in each of the partial work processes according to the kinds of said products, and for evaluating said total work processes on the basis of a result of the summation of the work amount information according to the kind of said products;

classification information selecting means for selecting information to be set as said classification information; and classification information addition means for adding the information selected by said classification information selecting means as said classification information, wherein variation in the set items which can be inputted in a case of compiling and/or comparing on the basis of a necessary one of a plurality of set items which can be set as classification information can be widened or enlarged, and the system can be applied to processing in other processes, thereby enabling efficient operation of the management system.

Further, in accordance with the process information management system as defined above, there is proposed a process information management system for managing process information on the basis of work procedures, said process information relating to processes for producing plural kinds of products on a production line and including work information for indicating each of the work procedures and work amount information for indicating the work amount of said work, comprising:

process compiling means for producing element work information by adding classification information to said process information, for composing work processes by arranging said element work information, and for memorizing said element work information as a sequence of files when said element work information is produced;

process evaluation means for compiling partial work processes by classifying total work processes on the basis of said classification information, for summing said work amount information in each of the partial work processes selected according to the kind of said products, and for evaluating said total work processes on the basis of a result of the summation of the work amount information according to the kind of said products;

application information storing means for storing at least application information of each of main parts for each kind of said products;

application information selection means for selecting said application information stored in said application information storing means; and application information addition means for adding information designating the application information which is selected by said application information selection means as said classification information, wherein the application information in common can be fully used, and the input operation in a case of adding the application information to the classification information becomes easy, thereby enabling efficient operation of the management system.

Furthermore, in accordance with the process information management system defined above, said application information selection means includes means for processing a plurality of the selected application information into a single unit of application information, and said application information addition means includes means for adding information designating the application information after being processed by said application information selection means to said classification information. Thereby, the application information can be produced by easier operation, and operation of adding information for designating the application information as the classification information becomes easier.

What is claimed is:

1. A process information management system for managing process information on the basis of work procedures, said process information relating to processes for producing plural kinds of products on a production line and including work information for indicating each of the work procedures and work amount information for indicating the work amount of said work procedures, comprising:

process compiling means for producing element work information, for composing work processes by arranging said element work information, and for memorizing said element work information as a sequence of files when said element work information is produced;

classification information selecting means for selecting information to be set as said classification information;

classification information addition means for adding the information selected by said classification information selecting means to said element work information to form processed classification information; and process evaluation means for compiling partial work processes by classifying total work processes on the basis of said processed classification information, for summing said work amount information in each of the partial work processes according to the kind of said products, and for evaluating said total world processes on the basis of a result of the summation of the work amount information according to the kind of said products.

2. A process information management system for managing process information on the basis of work procedures for accomplishing work, said process information relating to processes for producing plural kinds of products on a production line and including work information for indicating each of the work procedures and work amount information for indicating the work amount of said work, comprising:

process compiling means for producing element world information by adding classification information to said process information, for composing work processes by arranging said element work information, and for memorizing said element work information as a sequence of files when said element work information is produced;

process evaluation means for compiling partial work processes by classifying total work processes on the basis of said classification information, for summing said work amount information in each of the partial work processes according to the kind of said products, and for evaluating said total work processes on the basis of a result of the summation of the work amount information according to the kind of said products;

application information storing means for storing at least application information of each of main parts for each kind of said products;

application information selection means for selecting said application information stored in said application information storing means; and application information addition means for adding information designating the application information which is selected by said application information selection means to said classification information.

3. A process information management system as defined in claim 2, wherein said application information selection means includes means for processing a plurality of items of the selected application information into a single unit of application information, and said application information addition means includes means for adding inflation designating the application information after being processed by said application information selection means to said classification information.

* * * * *